(No Model.)  6 Sheets—Sheet 1.

D. H. FLETCHER.
CABINET DESK.

No. 341,100.  Patented May 4, 1886.

Witnesses:
A. A. Speer.
A. L. Fletcher.

Inventor:
D Horace Fletcher.

(No Model.)  6 Sheets—Sheet 2.

D. H. FLETCHER.
CABINET DESK.

No. 341,100.   Patented May 4, 1886.

Witnesses:
A. A. Speer.
A. L. Fletcher.

Inventor:
D. Horace Fletcher.

(No Model.) 6 Sheets—Sheet 3.

D. H. FLETCHER.
CABINET DESK.

No. 341,100. Patented May 4, 1886.

Witnesses
A. A. Speer
A. L. Fletcher

Inventor:
D. Horace Fletcher (No Model.) 6 Sheets—Sheet 4.

D. H. FLETCHER.
CABINET DESK.

No. 341,100. Patented May 4, 1886.

Witnesses:
A. A. Speer
A. L. Fletcher

Inventor:
D. Horace Fletcher

(No Model.)

D. H. FLETCHER.
CABINET DESK.

No. 341,100. Patented May 4, 1886.

Witnesses:
A. A. Speer.
A. L. Fletcher.

Inventor.
D. Horace Fletcher.

(No Model.) 6 Sheets—Sheet 6.

D. H. FLETCHER.
CABINET DESK.

No. 341,100. Patented May 4, 1886.

Witnesses:
A. A. Speer.
A. L. Fletcher.

Inventor:
D. Horace Fletcher.

UNITED STATES PATENT OFFICE.

D. HORACE FLETCHER, OF CHICAGO, ILLINOIS.

CABINET-DESK.

SPECIFICATION forming part of Letters Patent No. 341,100, dated May 4, 1886.

Application filed July 20, 1883. Serial No. 101,466. (No model.)

*To all whom it may concern:*

Be it known that I, D. HORACE FLETCHER, of Chicago, in the county of Cook and State of Illinois, have invented a new and useful Improvement in Cabinet-Desks, of which the following is a description, reference being had to the accompanying drawings, in which—

Like letters of reference indicate like parts in the different figures.

The object of my invention is to provide a cabinet or combination desk which may be utilized either as a secretary in its entirety or as a book-case and secretary or cabinet, or in which any other similar modification or combination may be effected, as desired, and which may be compact in its form, occupying the same space when open as when closed, present an equally-pleasing appearance in both situations, the locking of the main portion of which may be accomplished by a single lock, and the operation of which may be simple and easy. Said object I accomplish as follows: I construct said desk in two sections, preferably square, and of any height desired, each of said sections resting, respectively, upon a pivot or bolster placed beneath or near its center, said pivot resting in turn upon a caster or truck adapted to roll upon suitable tracks or ways upon or within a frame-work beneath the sections from which, if a small caster or truck is used, should be erected in the rear of the sections, preferably two posts arranged to sustain a top or cornice above said sections, which top is provided with suitable guides or grooves beneath, in which blocks are placed adapted to slide back and forth, said blocks in turn forming bearings into which pivots may be inserted, the object of said stationary top with guides and blocks being to prevent a backward or forward movement of said sections, and thereby sustain them in an erect position. It is essential that said guides beneath the top and said tracks upon the base shall run in the same direction, which is preferably in lines parallel to the front and rear of said desk. By means of a wide truck having a suitable bolster with friction-rollers turning upon segmental tracks, so constructed as to present a broad base for the support of said sections, I am enabled to modify said construction by dispensing with the use of said rear posts and stationary top, in which case the top may be divided in the middle, each half forming a part of each section and moving therewith. This I regard as the most desirable construction, though either form of truck may be used with the posts and stationary top. In addition to said pivots or bolsters, I hinge said sections to each other at their rear, preferably by means of three hinges, which may be of the ordinary kind, but confer certain advantages by being made with a double joint, so as to separate said sections somewhat from each other, as hereinafter more fully set forth. Upon the top hinge, projecting upward, and upon the lower hinge, projecting downward, are slotted lugs, into which the flanges of angle-irons may be fitted, said irons or their equivalents being rigidly secured across the top of the base at its center and across beneath the stationary top on the same line as the former. Said angle-irons are fitted loosely into said slotted lugs and form guides for the backward and forward movement of the hinges.
It is obvious that a movable post of sufficient width may be used, instead of the double-jointed hinges, to separate said sections, each section being hinged in turn to said post, which may be provided with slots, or may run in suitable guides on the bottom and top; but I prefer the hinges as being stronger and lighter. These devices when used together cause the sections as they are turned upon their respective pivots to partake of such a double movement as to enable the hinged corners of the sections to pass forward on a straight line, thereby causing each section to make one-quarter of a revolution, the inside being turned outward and presented to the front, and the whole to stand in proper line above the base, thus occupying the same space when open as when closed, said sections conforming in either position to the size and shape of the base.

Projecting forward from the central hinge and secured thereto by a swivel-connection is a flange, to which a table may be secured, the front of said table being supported by a brace or bracket having its lower end resting in a socket or other like device upon said bottom hinge. The table may be supported at the ends by suitable projections on the parts of the desk where it is desirable to have the ends of the table rest, and maintained therein by suitable spring-catches or sliding bolts; or the table may remain in a horizontal position and slide back between shelves; or it may be divided across the middle and so hinged as to raise up or be lowered in such a way as to be inclosed in the space caused by the separation of the sections, all of which will be hereinafter more fully described, and definitely pointed out in the claims.

Figure 3:
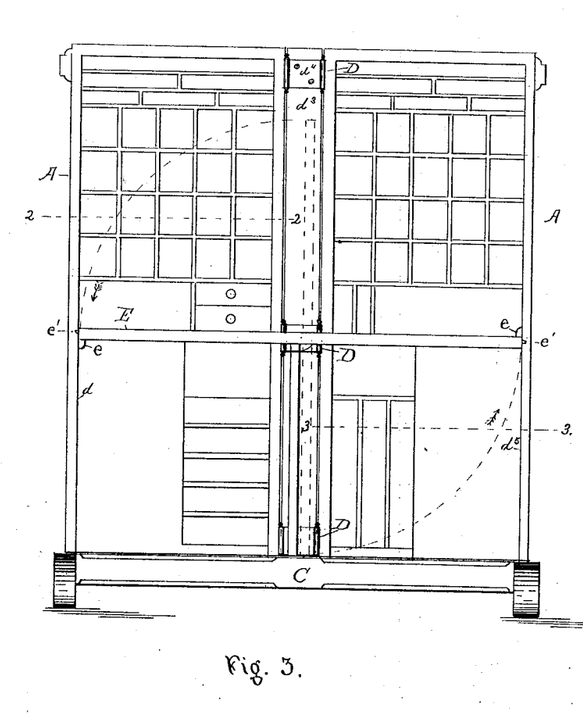
Fig. 3 is a front view when open, showing the top or cornice divided and forming a part of the sections.
Figure 4:
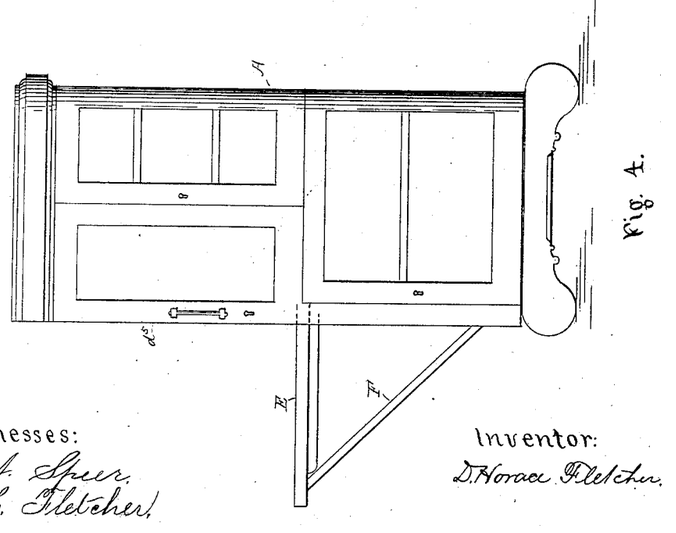
Fig. 4 is an end view of the same, showing the table extended for use.
Figure 5:
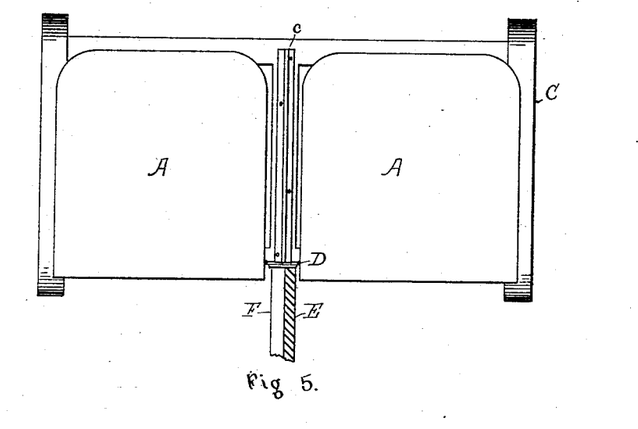
Fig. 5 is a top view showing form with divided top when open.
Figure 6:
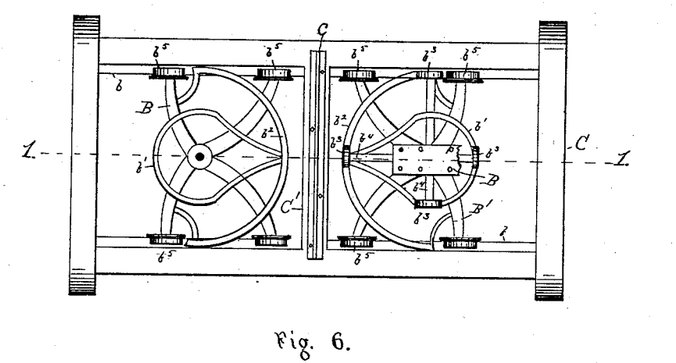
Fig. 6 is a top view of the base, showing the trucks for supporting and revolving the sections, with the bolster of one truck removed.
Figure 7:
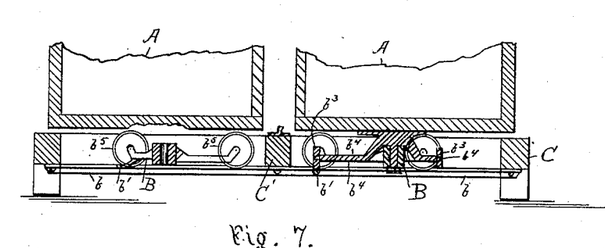
Fig. 7 is a longitudinal sectional view of same, cut through line 1 1, Fig. 6, with parts of sections indicated above.
Figure 8:
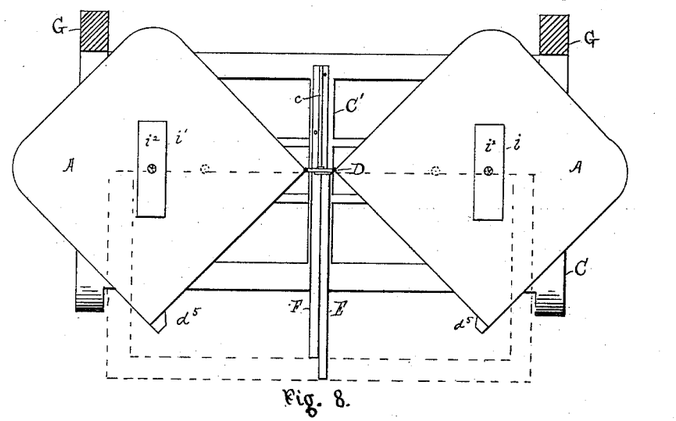
Fig. 8 is a top view of a modified form of the desk with the stationary top removed, showing the sections partly open.
Figure 9:
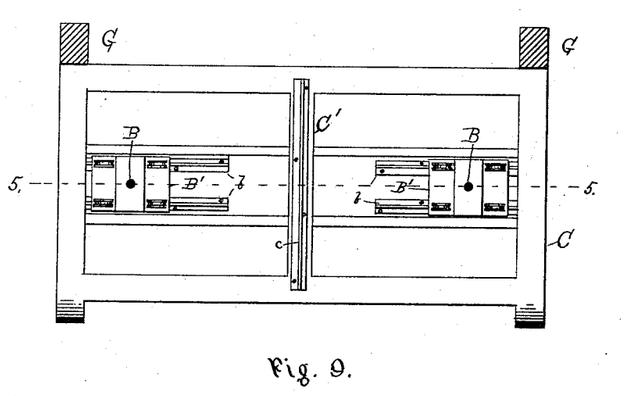
Fig. 9 is a top view of the base, showing a modified form of truck.
Figure 14:
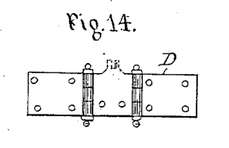
Fig. 14 is a face view of the top hinge.
Figure 15:
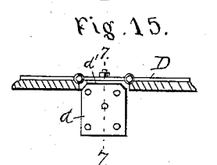
Fig. 15 is a top view of the central hinge.
Figure 16:
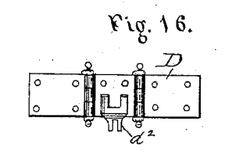
Fig. 16 is a face view of the bottom hinge.
Figure 17:
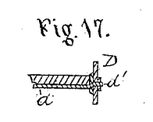
Fig. 17 is a sectional view of the middle hinge and its swivel connection, cut through the line 7 7, Fig. 15.
Figure 19:
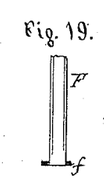
Fig. 19 is a view of a part of the table-brace with a pintle upon the bottom.
Figure 20:
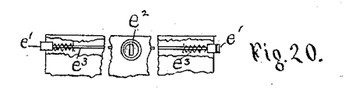
Fig. 20 is a top view of a part of the table so broken away as to show the spring-catches for holding the ends in position when in use.
Figure 21:
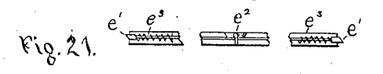
Fig. 21 is a face view of the same, cut through the line indicated by the rods connecting said catches in Fig. 20.

In the drawings, A A are the sections, the weight of which, respectively, is supported beneath its center upon pivots B B, having their bearings upon casters or trucks B' B', but preferably a modified form of truck, as shown in Figs. 6 and 7, hereinafter more fully described, said trucks, in whatever form used, being preferably mounted upon tracks $b\ b\ b\ b$, Figs. 6 and 9, upon a stationary base or frame, C, Figs. 6, 7, 9, and 10. I prefer to make the frame C substantially as shown in the drawings, with the cross-piece C', as shown in said last-named figures, for the better support of the tracks $b$, and to form a base for an angle-iron or similar guide, $c$, more clearly shown in Figs. 5, 8, and 9. I do not confine myself to the specific form of guide shown, but claim any suitable device that is capable of accomplishing a like result. I hinge the sections A A together at the back, as shown in Figs. 5 and 8, by any form of hinge, D, but preferably by means of double-jointed hinges, as shown in Figs. 14, 15, and 16, respectively, the central hinge of which, Fig. 15, is a top view, being preferably provided with a flange, $d$, for the support of the table, said flange having a horizontal swivel or pivotal bearing, $d'$, more clearly shown in Fig. 17, which is a sectional view of the same cut through the line 7 7, Fig. 15. The bottom hinge, Fig. 16, is provided with a slotted downward projection, $d^2$, into which the upward-projecting flange of the angle or $\perp$ iron $c$ is adjusted, so as to form a guide upon which said hinge may slide back and forth. To the central hinge is secured, as stated, the table E, which is preferably folded within the desk by turning the same upon said swivel to a vertical position, as shown in dotted lines in Fig. 3, which is a front view, and also as indicated in Fig. 8, which is a top view. Space for said table may be obtained within the desk when closed either by making the compartments therein of less depth or by separating the sections, as shown more clearly in Figs. 5 and 8, by means of said double-jointed hinges D, or otherwise, in which event, to close the space in the rear caused by said separation, I secure a thin piece or slat, $d^3$, clearly shown in Fig. 3, to said hinges by means of screws $d^4$, or otherwise; or portions of the back may be extended to meet together in the middle, and thus fill said space. Projections or flanges $d^5$, Figs. 3, 4, and 8, in the front of the desk serve a like purpose, and, further, to form an end support for the table, as shown in said Fig. 3, the projections $e\ e$ forming stops to prevent said table, when moved in the direction of the arrow, from revolving beyond a horizontal position. To hold said table in such position when thus revolved, I provide spring-catches $e'\ e'$, of the usual form, indicated in dotted lines in Fig. 3, and shown in detail in Figs. 20 and 21, Fig. 20 being a top view of the rear part of the table cut away to show said catches, which may be operated separately at each end, but preferably by means of a knob or thumb-piece, $e^2$, Figs. 20 and 21, pivoted in the middle of said table and having a cross-pin the respective ends of which may be connected with the catches $e'$ $e'$ by means of rods or wires $e^3$ $e^3$, having the spiral springs thereon, as shown. It is obvious that a pressure or turn upon the thumb-piece $e^2$ must serve to withdraw the catches and release the ends of the table, when the same may again take an upright position, as shown. To permit this action it is obvious that the bevels on the catches $e'$ $e'$ should be in opposite directions. I prefer to tip the projections $e$ $e$ with rubber, thereby preventing the catches $e'$ $e'$ from making noise or causing the table to be unsteady. As a front support for said table I prefer to use a brace or bar, F, so hinged at its top to the table, as shown in Fig. 4, as to permit said table to be revolved. The lower part of said brace F may be secured rigidly to the bottom hinge, D, or may be provided with a pintle, as shown in Fig. 19, or any suitable device to permit the same to be removably adjusted in a corresponding socket, $d^6$, upon the lower hinge, D. (Shown in Fig. 16.) This arrangement permits the table to be so hinged, as shown at $e^4$, Fig. 23, as to be raised up, thus permitting a more ready access to the lower part of the sections than when the table is in a position for use.

Figure 22:
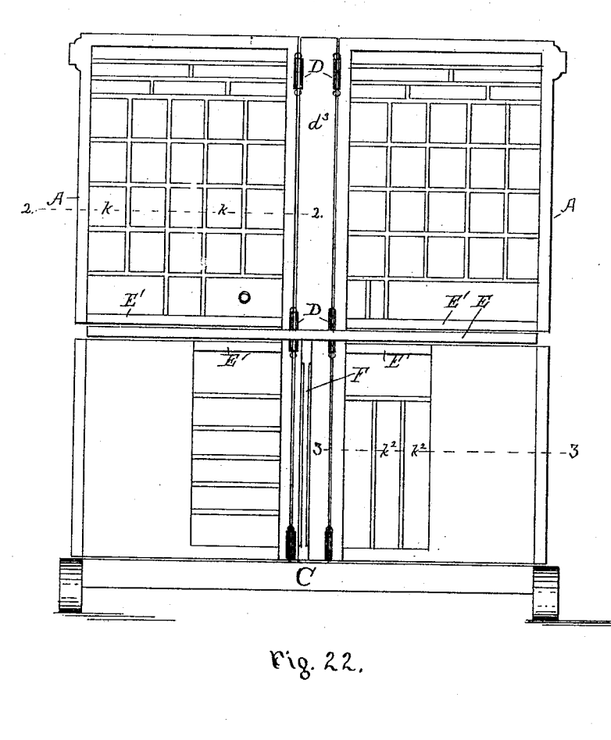
Fig. 22 is a front view of the desk when open, showing different means for inclosing and supporting the table.
Figure 23:
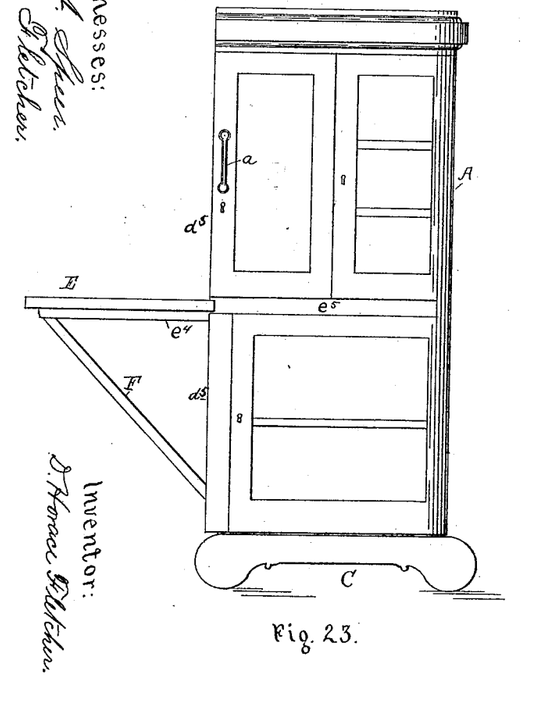
Fig. 23 is an end view of the same, showing the front cut away to permit the table to slide between two shelves.

As a modification of said mode of folding the table E within the desk, the same may be secured rigidly to said central hinge and allowed to pass back between shelves E' E' E' E', Fig. 22, the front of the desk being cut away, as at $e^5$, Fig. 23, which shows the front of one section at the end as it is when said desk is open, thus permitting the table to be of the full size of the desk, and to move out without obstruction, in the manner indicated in dotted lines in Fig. 8.

Figure 10:
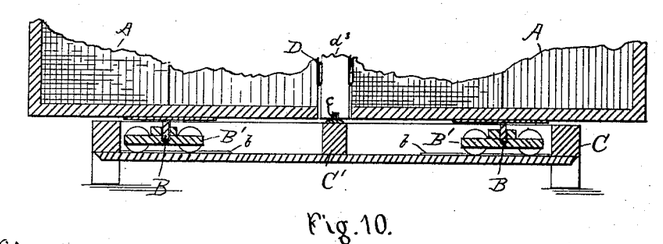
Fig. 10 is a longitudinal sectional view of Fig. 9, cut through the lines 5 5.

The movement of the sections of said desk in opening and closing the same is as follows: Assuming the desk to be closed, the pivots B B stand in their normal position, as in Figs. 6, 7. By grasping the handles $a$ $a$, Fig. 1, and pulling them apart, the fronts of the sections A A are separated, each turning upon its respective pivot B, thus rolling the two trucks B' B' away from each other and toward the respective ends of the base or frame C, the hinges D in the meantime moving forward in a straight line over the cross-bar C' being kept in line by the guide $c$, above described. When said desk is half open, said sections take the positions respectively as shown in Fig. 8, at which time the trucks B' B' have attained their farthest outward movement, as shown in Fig. 10, from which as the desk is opened wider the direction of their movement is reversed, and when fully open, as in Fig. 5, they are again in their normal position, at which time the book cases or parts forming the front of the desk when closed are at the ends. This movement I regard as novel and very important, as in no other way can the desk be so operated or rotated as to conform to the same space when open as when closed, and in no other form of desk can a book-case and secretary embodying equal space be combined, owing to the weight which it is necessary to sustain when in use.

It is obvious that any kind of truck or caster may be used to accomplish the movement above described, provided the sections A A are maintained in an upright position; but I prefer the form of truck shown in Figs. 6 and 7, for the reason that the truck itself may serve as a sufficient base to preserve the sections erect. By means of said trucks I am enabled to obtain a broad basal support, while the bearings may be in the most desirable position when the desk is open.

B', Fig. 6, shows the trucks of such length that they may attain their outward movement without touching the ends of the frame C. From the left-hand truck the bolster or pivot B is removed, while a top view of said bolster is shown in the right-hand truck in its normal position, or as it is when the desk is closed.

The trucks B' B' are each provided with two segmental tracks, $b'$ $b^2$, upon which wheels $b^3$ $b^3$ $b^3$ $b^3$ on the ends, respectively, of four projecting arms or axles, $b^4$ $b^4$ $b^4$ $b^4$, revolve. Said tracks should be placed sufficiently low to permit the wheels $b^4$ to rotate below the top of the base C, thereby permitting said sections to be placed near the base or frame. As the sections A A rotate the trucks B' B' move out and back while the bolsters B, secured to the sections, as shown, complete a quarter of a revolution upon said segmental tracks, thus bringing the wheels in the rear to the middle, while those of the long axles, standing normally upon the line 1 1, are brought to the front, the short axles changing in a corresponding manner.

As an equivalent of the above construction it is obvious that the conditions may be reversed, and instead of the rotating arms and wheels described, friction-rollers may be placed at fixed points at the front and rear, respectively, and upon the top of said trucks, so as to bear upon segmental plates upon the bottom of each section.

I prefer to make the wheels $b^3$ of the tracks B' B' with flanges or grooves on their periphery, so that they may not be in danger of running off the tracks $b$.

Figure 11:
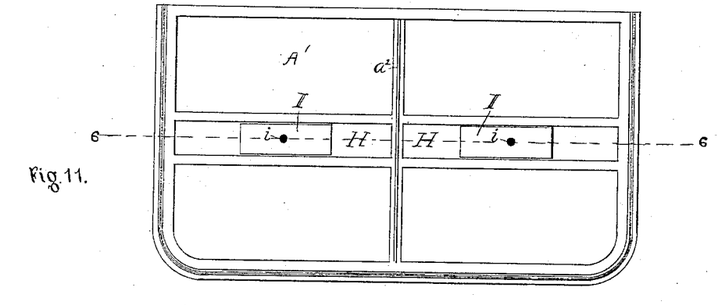
Fig. 11 is a bottom view of the stationary top, showing sliding blocks for supporting the sections when ordinary trucks are used.
Figure 12:
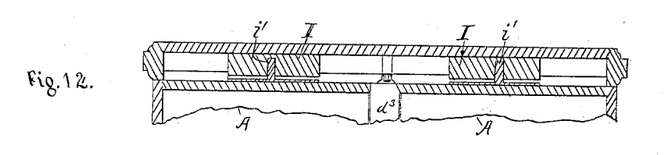
Fig. 12 is a longitudinal sectional view of the same cut through lines 6 6, Fig. 11, with a part of the sections indicated beneath.
Figure 18:
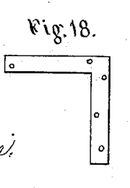
Fig. 18 is a view of an iron brace to support the stationary top.

The tracks $b$ may be of angle-iron or strips of wood with iron plates thereon and secured to the bottom of the frame C, and extending inward therefrom as shown in said Fig. 6, while said trucks B' B' may be provided with lugs or flanges projecting beneath said tracks and sliding thereunder, so as to secure said sections to the base and prevent their separation while transporting the desk. Should a narrow truck be used—as, for example, that shown in Figs. 9 and 10—the same may be utilized by adopting additional means for the vertical support of said sections upon their respective pivots. This may be readily accomplished by erecting posts G G (shown in elevation in Fig. 2 and in section in Figs. 8 and 9) in the rear of said sections and rigidly secured to the base or frame C, preferably at the corners. To the top of said posts G G, I secure, by means of corner-irons, as in Fig. 18, fastened to the inside of the post and cornice, respectively, a stationary top, A', Fig. 2, a bottom view of which is shown in Fig. 11, beneath which I place guides H H, in which may be fitted sliding blocks I I, having bearings $i\ i$ at their centers for the reception of pivots $i'\ i'$, Fig. 12, secured to the tops of said sections by means of suitable plates, $i^2\ i^2$. (Better shown in Fig. 8.) The posts G G and stationary top A' serve, by means of said guides and blocks, to prevent said sections from tipping forward or backward upon their pivots, while the blocks I I correspond in their movement to the trucks B' B'. Said blocks may be provided upon their sides with friction-rollers, if necessary, to facilitate their movement between said guides.

To prevent the stationary top from moving laterally by means of the warping or bending of the posts G G, and thus impairing the appearance of the desk, I secure an angle-iron or other suitable guide, $a^2$, beneath the top A', in which event a slotted lug should be placed upon the top hinge, D, as indicated in dotted lines in Fig. 14.

Figure 13:
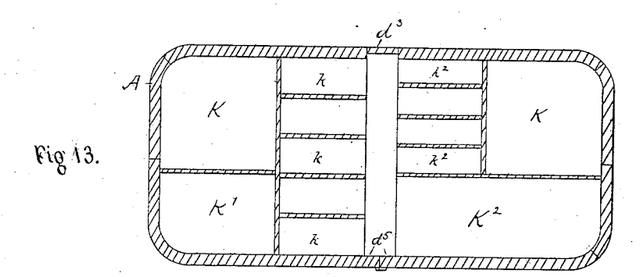
Fig. 13 is a top sectional view cut through the lines 2 2 and 3 3, respectively, in Fig. 22, showing the partitions as arranged above and below the table.

Fig. 13 shows one mode, and for most purposes the one which I prefer, of partitioning said sections.

Figure 2:
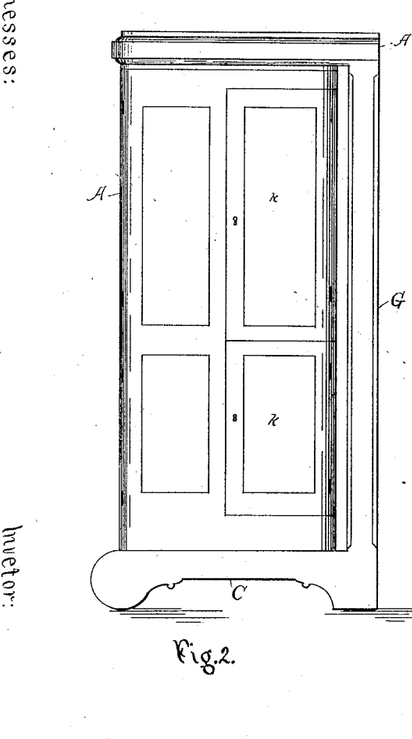
Fig. 2 is an end view of the same, showing the use of rear posts and a stationary top.

K K may be used as closets for storing papers not in use, or as an ordinary cabinet, the doors $k\ k$ thereto being shown in Fig. 2.

The compartments $k'$ indicate pigeon-holes in the upper part of one section, which may or may not be a duplicate of the other, cut through the line 2 2, Fig. 22, while $k^2$ are receptacles for blank-books and the like, and show a section cut through the line 3 3, Fig. 22.

Figure 1:
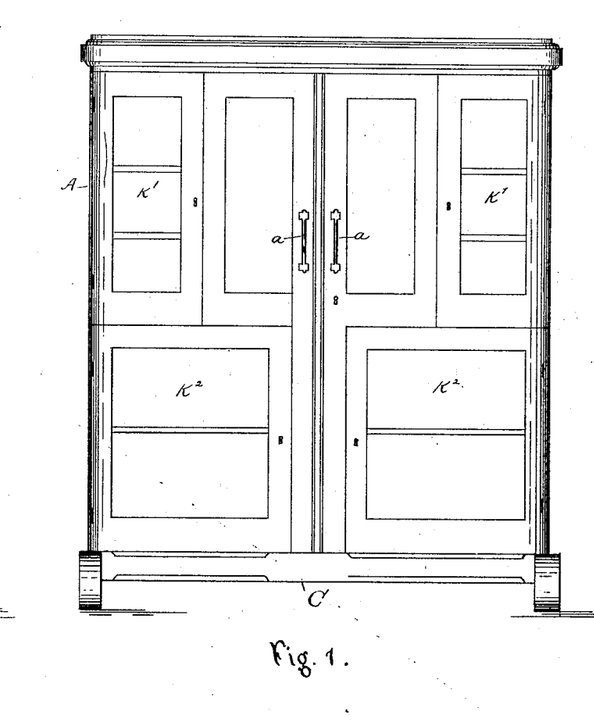
Figure 1 is a front view of said desk when closed.

K' K² show the book-cases as in Fig. 1. It is obvious that the entire front may be used as a book-case by limiting the compartments in the secretary, or the whole may form a secretary or cabinet, as desired. If the divided top is used, compartments may be arranged therein as shown in Fig. 3, thus utilizing the entire space within the desk. I do not confine myself to any special form of arranging the compartments, as any modification may be made therein to comply with particular wants.

When the posts G G are used, in order to prevent placing them too far back, or in such a position as to be unsightly, I prefer to round the rear corners, as shown, though otherwise it is unnecessary, except to obviate the appearance of having too great a depth, or to avoid standing the same too far from a wall.

Having thus described my invention, what I claim, and desire to secure by Letters Patent, is—

1. In a cabinet-desk, the combination of two sections hinged to each other, roller-trucks for supporting said sections, respectively, a common base for the reception of said trucks, and a transverse guide upon said base for engaging and directing said hinge-connection across said base on a line at right angles, or approximately so, to the line of movement described by said trucks, substantially as and for the purposes set forth.

2. In a cabinet-desk, the combination of two sections hinged to each other, separate trucks upon which the same are pivotally mounted, a common base with longitudinal ways thereon for the reception of said trucks, and means, as the guide $c$ and slotted hinge $d^2$, for guiding the hinged corners of said sections across said base, substantially as specified.

3. The combination, in a cabinet-desk, of two sections, trucks for mounting the same, a common base with longitudinal tracks for the reception of said trucks, double-jointed hinges for connecting said sections, and a tilting table provided with a suitable support attached to said hinged connection, substantially as described.

4. The combination, in a cabinet-desk, of two sections doubly hinged to each other and having an intermediate connecting part between the axes of said hinges, separate trucks upon which they are pivotally mounted, a stationary base with tracks arranged in the direction of its length for mounting said trucks, a transverse guide upon said base midway between its ends, and a slotted lug arranged midway between said hinges to engage said guide, whereby the rotation of said sections may cause said trucks to move simultaneously in opposite directions, and permit said hinges to pass in a straight line to and from the front and rear of said base, substantially as and for the purposes described.

5. In combination, the pivotally-mounted rotating sections of a cabinet-desk united to each other by an intermediate hinged connection, and a suitable table having its support attached to said hinged connection, substantially as described.

6. In combination, the pivotally-mounted rotating sections of a cabinet-desk united to each other by an intermediate hinged connection, and a tilting table having a support attached to said movable hinged connection, substantially as described.

7. In a cabinet-desk, the combination of the sections A A, hinged to each other, trucks for pivotally supporting the same, base C, having ways for the reception of said trucks, transverse guide $c$, and slotted lug $d^2$, with table E, provided with a suitable bracket and detachable end fastenings for supporting the same horizontally, substantially as described.

8. In combination with the rotating wings of a cabinet-desk mounted upon trucks, a stationary base, double-jointed hinges D, swivel $d$, attached to the central hinge, a tilting table connected therewith, and the slotted lug $d^2$, and guide $c$, substantially as described.

9. The combination, in a cabinet-desk, of rotating wings, a stationary base, trucks thereon for mounting said sections, an intermediate movable hinged connection for uniting said sections, and a table having its support attached to said intermediate connection, whereby said table may be drawn back and inclosed within said sections upon shutting the desk, substantially as described.

D. HORACE FLETCHER.

Witnesses:
P. C. DYRENFORTH,
JAMES H. PEIRCE.